United States Patent
Sakurada

(10) Patent No.: US 12,286,206 B2
(45) Date of Patent: Apr. 29, 2025

(54) MARINE VESSEL MANEUVERING SYSTEM AND MARINE VESSEL

(71) Applicant: YAMAHA HATSUDOKI KABUSHIKI KAISHA, Iwata (JP)

(72) Inventor: Kento Sakurada, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 508 days.

(21) Appl. No.: 17/540,445

(22) Filed: Dec. 2, 2021

(65) Prior Publication Data

US 2022/0177104 A1 Jun. 9, 2022

(30) Foreign Application Priority Data

Dec. 7, 2020 (JP) ................................. 2020-202530

(51) Int. Cl.
*B63H 21/21* (2006.01)
*H04L 12/40* (2006.01)

(52) U.S. Cl.
CPC ..... *B63H 21/213* (2013.01); *B63H 2021/216* (2013.01); *H04L 12/40* (2013.01); *H04L 2012/40286* (2013.01)

(58) Field of Classification Search
CPC ........ B63H 2020/003; B63H 2021/216; B63H 21/213; B63H 25/42; H04L 12/40; H04L 12/40013; H04L 2012/40286
See application file for complete search history.

(56) References Cited

U.S. PATENT DOCUMENTS

| | | | | |
|---|---|---|---|---|
| 7,540,793 B2* | 6/2009 | Okuyama | .............. | B63H 25/42 |
| | | | | 440/86 |
| 8,113,892 B1* | 2/2012 | Gable | ................... | B63H 21/21 |
| | | | | 114/144 RE |
| 10,650,621 B1* | 5/2020 | King | .................... | G07C 5/0816 |
| 10,972,401 B1* | 4/2021 | Kirchhoff | ............. | H04L 47/323 |
| 11,530,022 B1* | 12/2022 | Andrasko | ............. | B63H 25/42 |
| 11,563,726 B2* | 1/2023 | Green | ..................... | G06F 13/42 |
| 2007/0082565 A1 | 4/2007 | Okuyama | | |
| 2007/0224893 A1* | 9/2007 | Arvidsson | .............. | B63H 21/21 |
| | | | | 440/86 |
| 2009/0030567 A1* | 1/2009 | Gai | ......................... | F02D 41/28 |
| | | | | 440/84 |
| 2010/0305789 A1* | 12/2010 | Ito | ........................ | B63H 21/213 |
| | | | | 700/21 |

(Continued)

FOREIGN PATENT DOCUMENTS

JP 4666492 B2 4/2011

*Primary Examiner* — Thomas Ingram
*Assistant Examiner* — Michael J Herrera
(74) *Attorney, Agent, or Firm* — Keating & Bennett, LLP

(57) ABSTRACT

A marine vessel maneuvering system includes an operator, propulsion device controllers each configured or programmed to control driving of a respective propulsion device based on an operation signal from the operator, a first communication bus to transmit the operation signal to some of the propulsion device controllers, a second communication bus to transmit the operation signal to a remainder of the propulsion device controllers excluding the some of the propulsion device controllers, and a gateway device to connect the first communication bus to the second communication bus such that the first communication bus and the second communication bus communicate with each other.

20 Claims, 2 Drawing Sheets

(56) References Cited

U.S. PATENT DOCUMENTS

| | | | |
|---|---|---|---|
| 2015/0372975 A1* | 12/2015 | Moriya | H04L 63/0281 |
| | | | 726/11 |
| 2016/0059949 A1* | 3/2016 | Rebele | B63H 20/02 |
| | | | 440/6 |
| 2018/0208290 A1* | 7/2018 | Biebach | B63H 21/20 |
| 2018/0229823 A1* | 8/2018 | Inoue | G05D 1/0208 |
| 2019/0322299 A1* | 10/2019 | Mong | B61L 15/0072 |
| 2020/0374151 A1* | 11/2020 | Meier | H04L 12/40 |
| 2021/0258187 A1* | 8/2021 | Wada | H04L 12/4625 |
| 2022/0123957 A1* | 4/2022 | Gilton | H04L 12/40 |
| 2022/0411031 A1* | 12/2022 | Kanda | B63B 79/40 |

* cited by examiner

MARINE VESSEL MANEUVERING SYSTEM AND MARINE VESSEL

CROSS REFERENCE TO RELATED APPLICATIONS

This application claims the benefit of priority to Japanese Patent Application No. 2020-202530 filed on Dec. 7, 2020. The entire contents of this application are hereby incorporated herein by reference.

BACKGROUND OF THE INVENTION

1. Field of the Invention

The present invention relates to a marine vessel maneuvering system to maneuver a marine vessel by driving a plurality of propulsion devices and a marine vessel.

2. Description of the Related Art

A marine vessel maneuvering system to maneuver a marine vessel by driving a plurality of propulsion devices and a marine vessel are known in general. Such a marine vessel maneuvering system and a marine vessel are disclosed in Japanese Patent No. 4666492, for example.

Japanese Patent No. 4666492 discloses a marine vessel maneuvering system including an operator for a plurality of propulsion devices and a plurality of remote control-side ECUs (propulsion device controllers), one for each of the plurality of propulsion devices. Each of the plurality of remote control-side ECUs controls driving of each propulsion device based on an operation on the operator. The plurality of remote control-side ECUs are communicably connected to each other via a common CAN cable. A control is performed to coordinate driving of the plurality of propulsion devices such that operation information (driving information) is transmitted between the plurality of remote control-side ECUs and the rotation speeds of engines of the plurality of propulsion devices are kept within the same target value.

Although not clearly described in Japanese Patent No. 4666492, a marine vessel maneuvering system as described in Japanese Patent No. 4666492 is constructed to cause each remote control-side ECU to recognize the total number of propulsion devices in order to perform a control to coordinate driving of the propulsion devices between the plurality of remote control-side ECUs (propulsion device controllers). In such a marine vessel maneuvering system, each remote control-side ECU is caused to recognize the total number of propulsion devices such that a control is performed to coordinate driving of the propulsion devices according to the number of recognized propulsion devices, taking into consideration the balance of the driving forces and the directions of the propulsion devices, for example. In the marine vessel maneuvering system, when a propulsion device is added to the plurality of existing remote control-side ECUs connected via the common CAN cable such that the total number of propulsion devices exceeds the number recognized by each remote control-side ECU, the added remote control-side ECU and an existing predetermined remote control-side ECU are conceivably recognized as the same structure in the CAN communication line, and driving of two propulsion devices corresponding to the added remote control-side ECU and the existing predetermined remote control-side ECU is conceivably controlled in the same manner. In such a case, the balance of the driving forces and the directions of the propulsion devices may be lost, and a marine vessel may not be appropriately maneuvered. Furthermore, although not clearly described in Japanese Patent No. 4666492, in the field of marine vessel maneuvering systems, it is desired to construct a new system to control a larger number of propulsion devices than the number of propulsion devices recognized by existing remote control-side ECUs.

SUMMARY OF THE INVENTION

Preferred embodiments of the present invention provide marine vessel maneuvering systems and marine vessels that each control driving of a larger number of propulsion devices than the number of propulsion devices recognized by propulsion device controllers.

A marine vessel maneuvering system according to a preferred embodiment of the present invention includes an operator to receive an operation to drive a plurality of propulsion devices attached to a hull, a plurality of propulsion device controllers, one for each of the plurality of propulsion devices, configured or programmed to control driving of the plurality of propulsion devices based on an operation signal from the operator, a first communication bus to transmit the operation signal to some, but not all, of the plurality of propulsion device controllers, a second communication bus to transmit the operation signal to remaining propulsion device controllers excluding the some of the plurality of propulsion device controllers, and a gateway device to connect the first communication bus to the second communication bus such that the first communication bus and the second communication bus communicate with each other.

A marine vessel maneuvering system according to a preferred embodiment of the present invention includes the first communication bus to transmit the operation signal to some of the plurality of propulsion device controllers, the second communication bus to transmit the operation signal to the remaining propulsion device controllers excluding the some of the plurality of propulsion device controllers, and the gateway device to connect the first communication bus to the second communication bus such that the first communication bus and the second communication bus communicate with each other. Accordingly, the gateway device connects the first communication bus to the second communication bus such that the first communication bus and the second communication bus, which are different from each other, communicate with each other. Therefore, the gateway device between the first communication bus and the second communication bus mediates information transmission such that the number of propulsion devices recognized by the propulsion device controllers of the first communication bus and the number of propulsion devices recognized by the propulsion device controllers of the second communication bus become less than the number of propulsion devices actually attached to the hull. Thus, using the propulsion device controllers that virtually recognize a smaller number of propulsion devices than the number of propulsion devices actually attached to the hull, a larger number of propulsion devices than the number of propulsion devices recognized by existing propulsion device controllers are controlled.

In a marine vessel maneuvering system according to a preferred embodiment of the present invention, the plurality of propulsion device controllers are preferably configured or programmed to transmit and receive driving information regarding driving of the plurality of propulsion devices to and from each other via the first communication bus, the second communication bus, and the gateway device, and to perform a coordinated control to coordinate the driving of the plurality of propulsion devices based on the driving information. Accordingly, the driving information regarding the driving of the plurality of propulsion devices is transmitted and received between the plurality of propulsion device controllers via the first communication bus, the second communication bus, and the gateway device such that the coordinated control is performed to appropriately coordinate the driving of the plurality of propulsion devices.

In such a case, an upper limit number is preferably set in the plurality of propulsion device controllers for the plurality of propulsion devices on which the plurality of propulsion device controllers perform the coordinated control, and the gateway device is preferably configured or programmed to perform a control to divide the plurality of propulsion devices into two groups of a plurality of propulsion devices that are each less than the upper limit number for the first communication bus and the second communication bus, and to cause the plurality of propulsion device controllers to recognize that a number of the propulsion devices attached to the hull is equal to or less than the upper limit number even when an actual number of the propulsion devices attached to the hull exceeds the upper limit number. Accordingly, the propulsion device controllers recognize that the number of propulsion devices attached to the hull is equal to or less than the upper limit number, and thus a larger number of propulsion devices than the number of propulsion devices recognized by existing propulsion device controllers are more easily controlled.

In a marine vessel maneuvering system in which the upper limit number is set in the plurality of propulsion device controllers for the plurality of propulsion devices on which the plurality of propulsion device controllers perform the coordinated control, the gateway device is preferably configured or programmed to cause the plurality of propulsion device controllers to recognize that a number of the propulsion devices attached to the hull is equal to or less than the upper limit number by reducing a number of pieces of the driving information and transmitting the driving information to the propulsion device controllers of the second communication bus when receiving a plurality of pieces of the driving information from the propulsion device controllers of the first communication bus, and reducing the number of pieces of the driving information and transmitting the driving information to the propulsion device controllers of the first communication bus when receiving the plurality of pieces of the driving information from the propulsion device controllers of the second communication bus. Accordingly, the number of pieces of driving information transmitted via the second communication bus is reduced by the gateway device according to the number of propulsion devices recognized by the plurality of propulsion device controllers of the first communication bus. Furthermore, the number of pieces of driving information transmitted via the first communication bus is reduced by the gateway device according to the number of propulsion devices recognized by the plurality of propulsion device controllers of the second communication bus.

In a marine vessel maneuvering system including the propulsion device controllers caused to recognize that the number of propulsion devices attached to the hull is equal to or less than the upper limit number, when transmitting the driving information from one to the other of the first communication bus and the second communication bus, the gateway device is preferably configured or programmed to perform a control to transmit the driving information to the other of the first communication bus and the second communication bus while integrating the driving information to reduce the number of pieces of the driving information. Accordingly, the number of pieces of driving information transmitted from one to the other of the first communication bus and the second communication bus is easily reduced by integrating the driving information in the gateway device.

In a marine vessel maneuvering system including the gateway device to integrate the driving information, when transmitting the driving information in order to confirm driving of engines of all of the plurality of propulsion devices, the gateway device is preferably configured or programmed to transmit information indicating that an engine of one propulsion device is stopped as the integrated driving information when the engine of one of the plurality of propulsion devices with the integrated driving information is stopped. Accordingly, the propulsion device controllers are prevented from erroneously recognizing that the engines of all the propulsion devices are driven although the engine of one of the plurality of propulsion devices with the integrated driving information is stopped.

In a marine vessel maneuvering system in which the upper limit number is set in the plurality of propulsion device controllers for the plurality of propulsion devices on which the plurality of propulsion device controllers perform the coordinated control, the gateway device is preferably configured or programmed to perform a control to cause the plurality of propulsion device controllers to recognize that a number obtained by subtracting one from the actual number of the propulsion devices is the upper limit number of the propulsion devices when the actual number of the propulsion devices is one more than the upper limit number of the propulsion devices. Accordingly, the marine vessel maneuvering system is able to control driving of the number of propulsion devices obtained by adding one to the upper limit number of propulsion devices recognized by existing propulsion device controllers.

In such a case, the gateway device is preferably configured or programmed to perform a control to allocate three propulsion devices and two propulsion devices to the first communication bus and the second communication bus, respectively, and to cause the plurality of propulsion device controllers to recognize that the number of the propulsion devices attached to the hull is equal to or less than the upper limit number when the number of the propulsion devices attached to the hull is five, and the upper limit number of the propulsion devices is four. Accordingly, the marine vessel maneuvering system is able to control driving of five propulsion devices even when the upper limit number of propulsion devices is four due to the structure in which the propulsion device controllers recognize only four propulsion devices, the three propulsion device controllers are connected to the first communication bus, and the two propulsion device controllers are connected to the second communication bus.

In a marine vessel maneuvering system in which the three propulsion devices and the two propulsion devices are allocated to the first communication bus and the second communication bus, respectively, and the plurality of propulsion device controllers are caused to recognize that the number of propulsion devices attached to the hull is equal to or less than the upper limit number, the plurality of propulsion devices actually attached to the hull preferably include five propulsion devices at a portmost position, a center port position, a center position, a center starboard position, and a starboardmost position of the hull, the propulsion device controllers of the first communication bus are preferably configured or programmed to recognize that three of the propulsion device at the starboardmost position, the propulsion device at the portmost position, and one of the propulsion device at the center port position and the propulsion device at the center starboard position are connected thereto, and the propulsion device controllers of the second communication bus are preferably configured or programmed to recognize that the propulsion device at the center port position and the propulsion device at the center starboard position are connected thereto. Accordingly, while the propulsion device controllers recognize that the upper limit number of propulsion devices is four, three propulsion devices, the driving of which is controlled as the propulsion device at the starboardmost position, the propulsion device at the portmost position, and one of the propulsion device at the center port position and the propulsion device at the center starboard position, are connected to the propulsion device controllers of the first communication bus. Furthermore, while the propulsion device controllers recognize that the upper limit number of propulsion devices is four, two propulsion devices, the driving of which is controlled as the propulsion device at the center port position and the propulsion device at the center starboard position, are connected to the propulsion device controllers of the second communication bus.

In a marine vessel maneuvering system in which the plurality of propulsion devices actually attached to the hull include the five propulsion devices at the portmost position, the center port position, the center position, the center starboard position, and the starboardmost position of the hull, the gateway device is preferably configured or programmed to control a corresponding propulsion device controller to drive, as the propulsion device at the center position, one propulsion device recognized as being connected as one of the propulsion device at the center port position and the propulsion device at the center starboard position by the corresponding propulsion device controller among the three propulsion devices of the first communication bus in a predetermined marine vessel maneuvering mode. Accordingly, when the plurality of propulsion device controllers recognize that the upper limit number of propulsion devices is four, one propulsion device is driven not as the propulsion device at the portmost position, the center port position, the center starboard position, or the starboardmost position, but as the propulsion device at the center position. Consequently, in the predetermined marine vessel maneuvering mode, the balance of the driving forces and the directions of the propulsion devices is prevented from being lost.

In a marine vessel maneuvering system including the plurality of propulsion device controllers configured or programmed to transmit and receive the driving information regarding the driving of the plurality of propulsion devices to and from each other via the first communication bus, the second communication bus, and the gateway device, one predetermined propulsion device of the plurality of propulsion devices, which functions as a reference for the first communication bus, preferably transmits the driving information regarding a rotation speed of its own engine to remaining propulsion devices of the plurality of propulsion devices in order to equalize rotation speeds of engines of all of the plurality of propulsion devices, and the gateway device is preferably configured or programmed to transmit the driving information from the one predetermined propulsion device to each of the propulsion devices of the second communication bus when transmitting the driving information in order to equalize the rotation speeds of the engines of all of the plurality of propulsion devices. Accordingly, the gateway device is configured or programmed to transmit the driving information regarding the rotation speed of the engine from one predetermined propulsion device of the first communication bus to a plurality of locations, and thus all the propulsion device controllers of the second communication bus receive one piece of driving information regarding the rotation speed of the engine transmitted to the propulsion devices of the second communication bus.

In a marine vessel maneuvering system according to a preferred embodiment of the present invention, the gateway device is preferably configured or programmed to perform a control to automatically drive the plurality of propulsion devices to move the hull in an automatic marine vessel maneuvering mode in addition to connecting the first communication bus to the second communication bus such that the first communication bus and the second communication bus communicate with each other. Accordingly, the gateway device is used for two applications to connect the first communication bus to the second communication bus such that the first communication bus and the second communication bus communicate with each other and to perform a control to automatically drive the plurality of propulsion devices to move the hull in the automatic marine vessel maneuvering mode. Consequently, the number of components is reduced, and the system structure is simplified as compared with a case in which the two applications are achieved by separate structures.

In a marine vessel maneuvering system according to a preferred embodiment of the present invention, the gateway device is preferably configured or programmed to perform a control to automatically drive the plurality of propulsion devices to hold a position and an orientation of the hull in a fixed point holding mode in addition to connecting the first communication bus to the second communication bus such that the first communication bus and the second communication bus communicate with each other. Accordingly, the gateway device is used for two applications to connect the first communication bus to the second communication bus such that the first communication bus and the second communication bus communicate with each other and to perform a control to automatically drive the plurality of propulsion devices to hold the position and orientation of the hull in the fixed point holding mode. Consequently, the number of components is reduced, and the system structure is simplified as compared with a case in which the two applications are achieved by separate structures.

In a marine vessel maneuvering system according to a preferred embodiment of the present invention, the first communication bus is preferably directly connected to the operator, and the second communication bus is preferably indirectly connected to the operator via the gateway device and the first communication bus. Accordingly, the plurality of propulsion device controllers and the operator are connected to the gateway device via the common first communication bus. Therefore, the system structure is simplified.

In a marine vessel maneuvering system according to a preferred embodiment of the present invention, the first communication bus and the second communication bus are preferably communicably connected to each other by a bus cable based on a CAN communication standard. Accordingly, mutual communication between the plurality of propulsion device controllers is easily achieved by the bus cable based on the CAN communication standard.

A marine vessel according to a preferred embodiment of the present invention includes a hull, and a marine vessel maneuvering system provided on the hull. The marine vessel maneuvering system includes an operator to receive an operation to drive a plurality of propulsion devices attached to the hull, a plurality of propulsion device controllers, one for each of the plurality of propulsion devices, configured or programmed to control driving of the plurality of propulsion devices based on an operation signal from the operator, a first communication bus to transmit the operation signal to some, but not all, of the plurality of propulsion device controllers, a second communication bus to transmit the operation signal to remaining propulsion device controllers excluding the some of the plurality of propulsion device controllers, and a gateway device to connect the first communication bus to the second communication bus such that the first communication bus and the second communication bus communicate with each other.

A marine vessel according to a preferred embodiment of the present invention includes the first communication bus to transmit the operation signal to some, but not all, of the plurality of propulsion device controllers, the second communication bus to transmit the operation signal to the remaining propulsion device controllers excluding the some of the plurality of propulsion device controllers, and the gateway device to connect the first communication bus to the second communication bus such that the first communication bus and the second communication bus communicate with each other.

Accordingly, the gateway device connects the first communication bus to the second communication bus such that the first communication bus and the second communication bus, which are different from each other, communicate with each other. Therefore, the gateway device between the first communication bus and the second communication bus mediates information transmission such that the number of propulsion devices recognized by the propulsion device controllers of the first communication bus and the number of propulsion devices recognized by the propulsion device controllers of the second communication bus become less than the number of propulsion devices actually attached to the hull. Thus, using the propulsion device controllers that virtually recognize a smaller number of propulsion devices than the number of propulsion devices actually attached to the hull, a larger number of propulsion devices than the number of propulsion devices recognized by existing propulsion device controllers are controlled.

In a marine vessel according to a preferred embodiment of the present invention, the plurality of propulsion device controllers are preferably configured or programmed to transmit and receive driving information regarding driving of the plurality of propulsion devices to and from each other via the first communication bus, the second communication bus, and the gateway device, and perform a coordinated control to coordinate the driving of the plurality of propulsion devices based on the driving information. Accordingly, the driving information regarding the driving of the plurality of propulsion devices is transmitted and received between the plurality of propulsion device controllers via the first communication bus, the second communication bus, and the gateway device such that the coordinated control is performed to appropriately coordinate the driving of the plurality of propulsion devices.

In such a case, an upper limit number is preferably set in the plurality of propulsion device controllers for the plurality of propulsion devices on which the plurality of propulsion device controllers perform the coordinated control, and the gateway device is preferably configured or programmed to perform a control to divide the plurality of propulsion devices into two groups of a plurality of propulsion devices that are each less than the upper limit number for the first communication bus and the second communication bus, and to cause the plurality of propulsion device controllers to recognize that a number of the propulsion devices attached to the hull is equal to or less than the upper limit number even when an actual number of the propulsion devices attached to the hull exceeds the upper limit number. Accordingly, the propulsion device controllers recognize that the number of propulsion devices attached to the hull is equal to or less than the upper limit number, and thus a larger number of propulsion devices than the number of propulsion devices recognized by existing propulsion device controllers are more easily controlled.

In a marine vessel in which the upper limit number is set in the plurality of propulsion device controllers for the plurality of propulsion devices on which the plurality of propulsion device controllers perform the coordinated control, the gateway device is preferably configured or programmed to cause the plurality of propulsion device controllers to recognize that a number of the propulsion devices attached to the hull is equal to or less than the upper limit number by reducing a number of pieces of the driving information and transmitting the driving information to the propulsion device controllers of the second communication bus when receiving a plurality of pieces of the driving information from the propulsion device controllers of the first communication bus, and reducing the number of pieces of the driving information and transmitting the driving information to the propulsion device controllers of the first communication bus when receiving the plurality of pieces of the driving information from the propulsion device controllers of the second communication bus. Accordingly, the number of pieces of driving information transmitted via the second communication bus is reduced by the gateway device according to the number of propulsion devices recognized by the plurality of propulsion device controllers of the first communication bus. Furthermore, the number of pieces of driving information transmitted via the first communication bus is reduced by the gateway device according to the number of propulsion devices recognized by the plurality of propulsion device controllers of the second communication bus.

In a marine vessel including the propulsion device controllers caused to recognize that the number of propulsion devices attached to the hull is equal to or less than the upper limit number, when transmitting the driving information from one to the other of the first communication bus and the second communication bus, the gateway device is preferably configured or programmed to perform a control to transmit the driving information to the other of the first communication bus and the second communication bus while integrating the driving information to reduce the number of pieces of the driving information. Accordingly, the number of pieces of driving information transmitted from one to the other of the first communication bus and the second communication bus is easily reduced by integrating the driving information in the gateway device.

The above and other elements, features, steps, characteristics and advantages of the present invention will become more apparent from the following detailed description of the preferred embodiments with reference to the attached drawings.

DETAILED DESCRIPTION OF THE
PREFERRED EMBODIMENTS

Preferred embodiments of the present invention are hereinafter described with reference to the drawings.

The structure of a marine vessel 100 including a marine vessel maneuvering system 102 according to preferred embodiments of the present invention is now described with reference to FIGS. 1 to 4. In the figures, arrow FWD represents the forward movement direction of the marine vessel 100 (front side with reference to a hull 100a), and arrow BWD represents the reverse movement direction of the marine vessel 100 (rear side with reference to the hull 100a).

Figure 1:
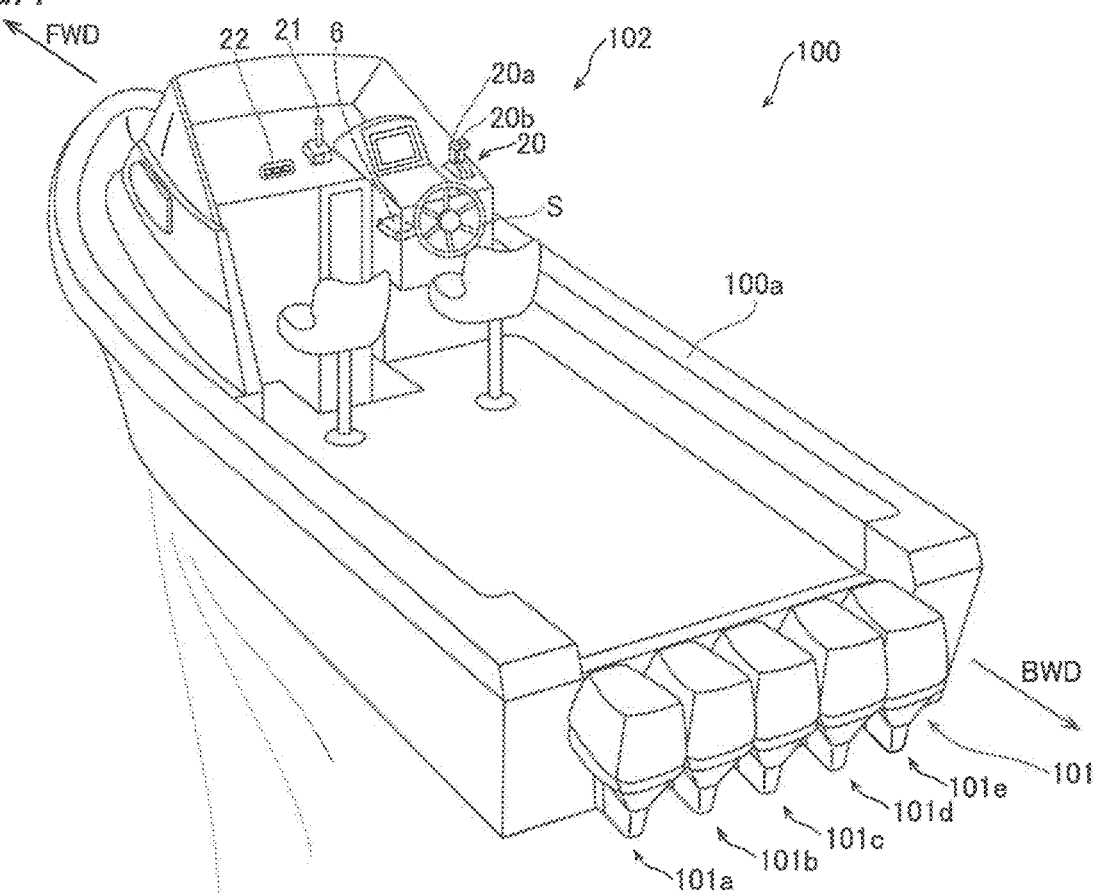
FIG. 1 is a perspective view schematically showing a marine vessel including outboard motors and a marine vessel maneuvering system according to a preferred embodiment of the present invention.

As shown in FIG. 1, the marine vessel 100 includes the hull 100a, a plurality of (for example, five) outboard motors 101 (101a to 101e), and the marine vessel maneuvering system 102. The outboard motors 101 are examples of a "propulsion device".

The plurality of outboard motors 101 are attached to a transom of the hull 100a. That is, the marine vessel 100 is an outboard motor boat including the plurality of outboard motors 101.

Figure 2:
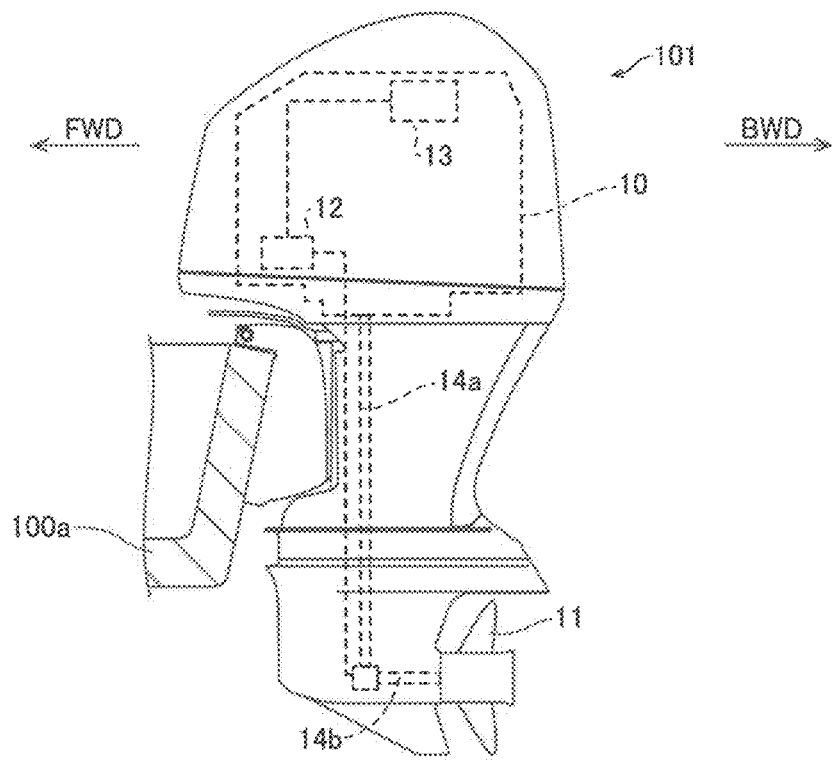
FIG. 2 is a side view illustrating the structure of an outboard motor according to a preferred embodiment of the present invention.

As shown in FIG. 2, each of the outboard motors 101 includes an engine 10, a propeller 11, a shift actuator 12, and an electronic control unit (ECU) 13. Each of the outboard motors 101 is operated by a steering S such that its direction in a right-left direction is changed. Furthermore, each of the outboard motors 101 is operated by a remote control lever 20 such that the rotation speed (propulsion speed) of the engine 10 is changed.

The engine 10 is, for example, an internal combustion engine, and generates a driving force by burning fuel and rotating a crankshaft (not shown). The engine 10 rotates the propeller 11 by the generated driving force.

The shift actuator 12 switches the shift state of each of the outboard motors 101 to one of a forward movement state (F), a neutral state (N), and a reverse movement state (R) based on an operation to switch the remote control lever 20 of the marine vessel maneuvering system 102, which is described below, to one of a forward movement position, a neutral position, and a reverse movement position.

The "shift state" described above refers to a state in which a driving force is transmitted from a drive shaft 14a to a propeller shaft 14b. In the forward movement state (F) the propeller 11 rotates in a predetermined direction to move the hull 100a forward, in the reverse movement state (R) the propeller 11 rotates in a direction opposite to the predetermined direction to move the hull 100a rearward, and in the neutral state (N) the propeller 11 does not rotate.

The ECU 13 is a control circuit including a central processing unit (CPU) and a memory. The ECU 13 controls driving of the engine 10 and driving of the shift actuator 12 based on a command from the marine vessel maneuvering system 102. The ECU 13 performs various drive control processes by executing programs stored in the memory.

The number of outboard motors 101 in the present preferred embodiment is preferably five, for example, including the outboard motor 101a at the portmost position (P: port side), the outboard motor 101b at the center port position (CP: center port side), the outboard motor 101c at the center position (C: center), the outboard motor 101d at the center starboard position (CS: center starboard), and the outboard motor 101e at the starboardmost position (S: starboard).

The outboard motors 101a, 101c, and 101e are connected to a first communication bus 4 via remote control electronic control units (ECUs) 3. The outboard motors 101b and 101d are connected to a second communication bus 5 via remote control ECUs 3.

Figure 4:
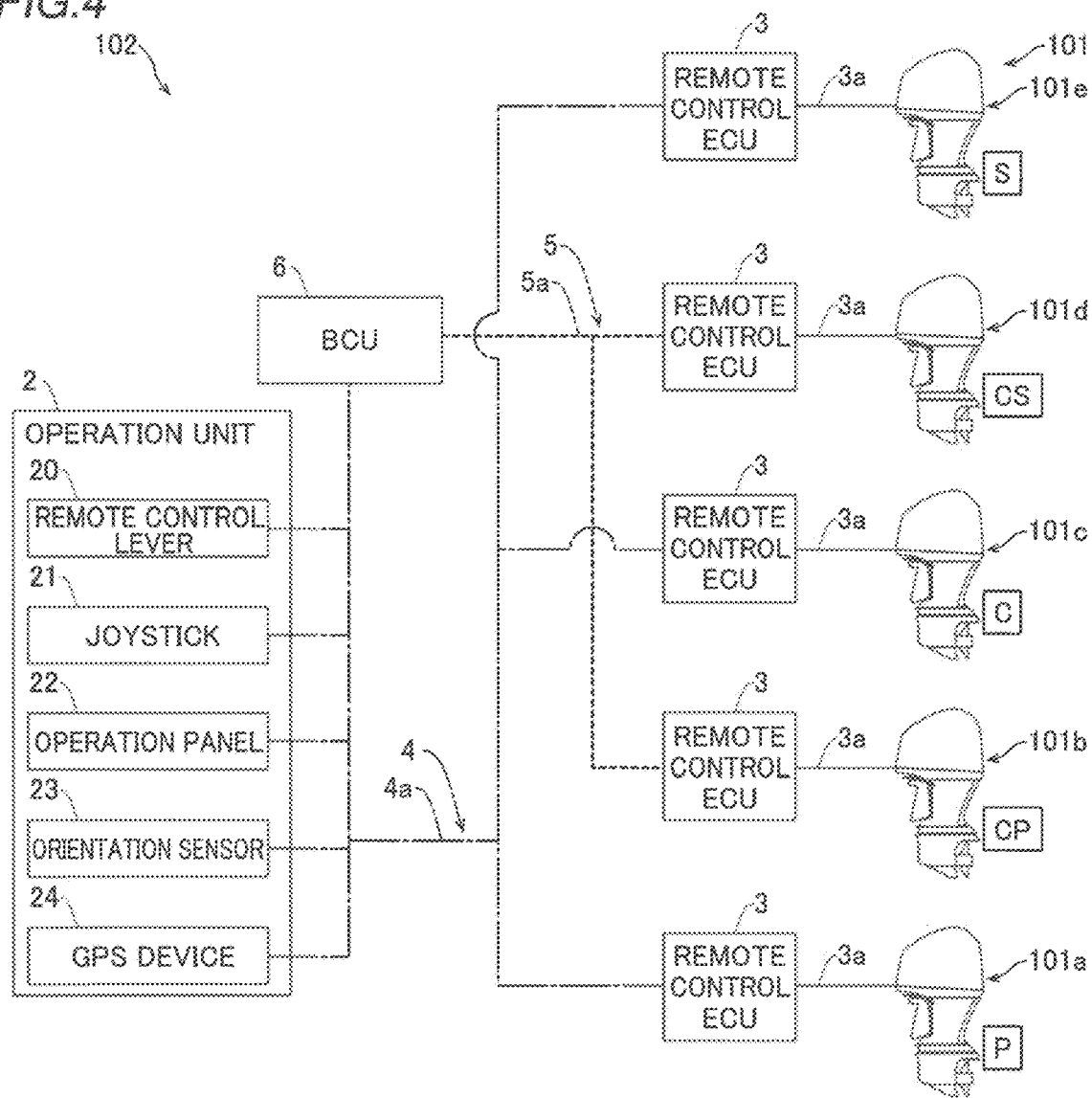
FIG. 4 is a block diagram showing a marine vessel maneuvering system according to a preferred embodiment of the present invention.

The marine vessel maneuvering system 102 shown in FIG. 4 maneuvers the marine vessel 100 (see FIG. 1). That is, the marine vessel maneuvering system 102 controls driving of the plurality of outboard motors 101 based on a vessel operator's operation on an operation unit 2.

The marine vessel maneuvering system 102 includes the operation unit 2, the remote control ECUs 3, the first communication bus 4, the second communication bus 5, and a boat control unit (BCU) 6. The remote control ECUs 3 are examples of a "propulsion device controller". The BCU 6 is an example of a "gateway device".

The operation unit 2 includes the remote control lever 20, a joystick 21, and an operation panel 22 to receive operations to drive the plurality of outboard motors 101 attached to the hull 100a, an orientation sensor 23, and a GPS device 24. The remote control lever 20, the joystick 21, and the operation panel 22 are examples of an "operator".

In a joystick mode, the joystick 21 receives both a propulsive force operation to change the propulsive forces of the outboard motors 101 (see FIG. 3) and a steering operation to drive the outboard motors 101 to steer the marine vessel 100. That is, the joystick 21 generally performs the operation functions of both the steering S (see FIG. 1) and the remote control lever 20.

The joystick mode is a mode in which the marine vessel 100 is operated by the joystick 21 instead of the steering S and the remote control lever 20 unlike a normal marine vessel maneuvering mode in which the marine vessel 100 is operated by the steering S and the remote control lever 20. An operation signal is transmitted from the joystick 21 to the BCU 6.

The remote control lever 20 adjusts the throttle opening degree of the engine 10 to increase or decrease the propulsion speed. The remote control lever 20 includes a lever 20a (see FIG. 1) to receive an operation on the port outboard motors 101 (101a, 101b) and a lever 20b (see FIG. 1) to receive an operation on the starboard outboard motors 101 (101d, 101e). The outboard motor 101c at the center position is driven by the average of the amount of operation on the lever 20a and the amount of operation on the lever 20b.

The levers 20a and 20b are tiltable in a forward-rearward direction. That is, the port and starboard outboard motors 101 are individually driven. A predetermined operation button (not shown) may be pressed such that all the outboard motors 101 are similarly driven by one of the levers 20a and 20b of the remote control lever 20.

The remote control lever 20 switches the neutral states, the forward movement states, and the reverse movement states of the outboard motors 101. An operation signal is transmitted from the remote control lever 20 to the BCU 6.

Figure 3:
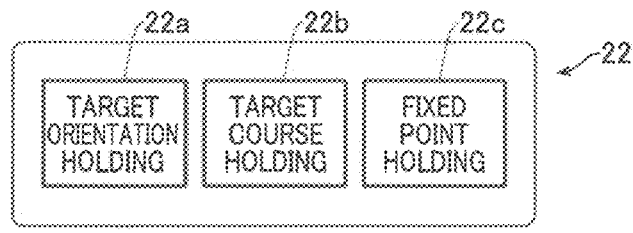
FIG. 3 is a diagram schematically showing an operation panel of a marine vessel maneuvering system according to a preferred embodiment of the present invention.

As shown in FIG. 3, the operation panel 22 includes various operation buttons to transition to an automatic marine vessel maneuvering mode. Specifically, the operation panel 22 includes a button 22a to transition to a target orientation holding mode as the automatic marine vessel maneuvering mode. The operation panel 22 also includes a button 22b to transition to a target course holding mode as the automatic marine vessel maneuvering mode. The operation panel 22 also includes a button 22c to transition to a fixed point holding mode.

The target orientation holding mode is a marine vessel maneuvering mode to automatically drive the plurality of outboard motors 101 (see FIG. 1) to hold the target orientation of the marine vessel 100 (see FIG. 1). In the target orientation holding mode, when the marine vessel 100 drifts due to wind or waves, for example, a point located ahead in the target orientation of the marine vessel 100 varies, but the target orientation is maintained unchanged.

The target course holding mode is a marine vessel maneuvering mode to hold the linear target course of the marine vessel 100. In the target course holding mode, when the marine vessel 100 drifts due to wind or waves, for example (when the marine vessel 100 deviates from the linear target course), a predetermined control is performed to return to the linear target course.

The fixed point holding mode is a marine vessel maneuvering mode to automatically drive the plurality of outboard motors 101 to hold the position and orientation of the hull 100a (see FIG. 1). An operation signal is transmitted from the operation panel 22 to the BCU 6 (see FIG. 4).

The orientation sensor 23 shown in FIG. 4 detects the current orientation to which the marine vessel 100 is heading. A detection signal is transmitted from the orientation sensor 23 to the BCU 6.

The GPS device 24 acquires a GPS signal relating to the current position of the marine vessel 100 from a satellite. The GPS device 24 specifies the current position of the marine vessel 100 based on the acquired GPS signal.

The first communication bus 4 shown in FIG. 4 transmits an operation signal and a detection signal from the operation unit 2 to some, but not all, of the remote control ECUs 3. Furthermore, the first communication bus 4 transmits the operation signal and the detection signal to the outboard motor 101a, the outboard motor 101c, and the outboard motor 101e.

The first communication bus 4 is directly connected to the operation unit 2 (the remote control lever 20, the joystick 21, the operation panel 22, the orientation sensor 23, and the GPS device 24).

The second communication bus 5 transmits an operation signal and a detection signal from the operation unit 2 to the remaining remote control ECUs 3 excluding the "some of the remote control ECUs 3" described above. Furthermore, the second communication bus 5 transmits the operation signal and the detection signal to the outboard motor 101b and the outboard motor 101d.

The second communication bus 5 is indirectly connected to the operation unit 2 (the remote control lever 20, the joystick 21, the operation panel 22, the orientation sensor 23, and the GPS device 24) via the BCU 6 and the first communication bus 4.

The first communication bus 4 and the second communication bus 5 are communicably connected to each other by bus cables 4a and 5a based on the control area network (CAN) communication standards.

The first communication bus 4 and the second communication bus 5 are communicably connected to each other by the BCU 6.

The remote control ECU 3 is a control circuit including a CPU and a memory. One remote control ECU 3 is provided for each of the plurality of outboard motors 101. The remote control ECU 3 controls driving of each of the outboard motors 101 based on the operation signal and the detection signal from the operation unit 2.

The remote control ECUs 3 and the outboard motors 101 are connected by drive-by-wire communication cables 3a. That is, the remote control ECUs 3 transmit electric signals to the outboard motors 101 via the communication cables 3a to control driving of the outboard motors 101.

A plurality of remote control ECUs 3 transmit and receive driving information regarding driving of the outboard motors 101 to and from each other via the first communication bus 4, the second communication bus 5, and the BCU 6. Furthermore, the plurality of remote control ECUs 3 perform a coordinated control to coordinate driving of the plurality of outboard motors 101 based on the driving information.

The "coordinated control" includes a control (speed control) to coordinate the rotation speeds of all of the outboard motors 101, for example. In addition, the "coordinated control" includes a control to coordinate the rotation speeds and directions of some or all of the outboard motors 101 in the automatic marine vessel maneuvering mode and the joystick mode, for example. That is, the "coordinated control" refers to a control to adjust driving of each of the plurality of outboard motors 101 and coordinate driving among the plurality of outboard motors 101 based on the driving information of the remaining outboard motors 101.

An upper limit number is set in the remote control ECUs 3 for the outboard motors 101 on which the remote control ECUs 3 perform the coordinated control. Specifically, the upper limit number of outboard motors 101 on which the remote control ECUs 3 perform the coordinated control is four, for example.

That is, the remote control ECUs 3 recognize that the number of outboard motors 101 attached to the hull 100a is four, for example, and perform the coordinated control.

However, the actual number of outboard motors 101 attached to the hull 100a is five, for example. Therefore, the BCU 6 performs a control to divide the plurality of outboard motors 101 into two groups of a plurality of outboard motors that are each less than the upper limit number (into three outboard motors and two outboard motors) for the first communication bus 4 and the second communication bus 5, and to cause the remote control ECUs 3 to recognize that the number of outboard motors 101 attached to the hull 100a is equal to or less than the upper limit number (four) even when the actual number (five) of outboard motors 101 attached to the hull 100a exceeds the upper limit number (four, for example).

Then, each of a plurality of (three, for example) remote control ECUs 3 on the first communication bus 4 side recognizes that three of the outboard motor 101 at the portmost position (P), the outboard motor 101 at the starboardmost position (S), and the outboard motor 101 at the center port position (CP) (or the outboard motor 101 at the center starboard position (CS)) are connected thereto while recognizing that the number of outboard motors 101 attached to the hull 100a is four, for example.

Actually, three of the outboard motor 101a at the portmost position (P), the outboard motor 101e at the starboardmost position (S), and the outboard motor 101c at the center position (C) are connected to the plurality of (three) remote control ECUs 3 on the first communication bus 4 side, respectively.

Each of a plurality of (two) remote control ECUs 3 on the second communication bus 5 side recognizes that the outboard motor 101 at the center port position (CP) and the outboard motor 101 at the center starboard position (CS) are connected thereto while recognizing that the number of outboard motors 101 attached to the hull 100a is four, for example.

Actually, the outboard motor 101b at the center port position (CP) and the outboard motor 101d at the center starboard position (CS) are connected to the plurality of (two) remote control ECUs 3 on the second communication bus 5 side, respectively, like the recognition described above.

The BCU 6 is a control circuit including a CPU and a memory. The BCU 6 performs a control to automatically drive the plurality of outboard motors 101 to move the hull 100a in the automatic marine vessel maneuvering mode. That is, the BCU 6 is a control device to control driving of the plurality of outboard motors 101 in the automatic marine vessel maneuvering mode.

The BCU 6 performs a control to automatically drive the plurality of outboard motors 101 to hold the position and orientation of the hull 100a in the fixed point holding mode. That is, the BCU 6 is a control device to control driving of the plurality of outboard motors 101 in the fixed point holding mode.

The BCU 6 connects the first communication bus 4 to the second communication bus 5 such that the first communication bus 4 and the second communication bus 5 communicate with each other. That is, the BCU 6 functions as a so-called gateway to connect networks having different protocols.

The BCU 6 reduces the number of pieces of driving information and transmits the driving information to the remote control ECUs 3 on the second communication bus 5 side when receiving a plurality of pieces of driving information from the plurality of remote control ECUs 3 on the first communication bus 4 side. Furthermore, the BCU 6 reduces the number of pieces of driving information and transmits the driving information to the remote control ECUs 3 on the first communication bus 4 side when receiving a plurality of pieces of driving information from the plurality of remote control ECUs 3 on the second communication bus 5 side. Consequently, the BCU 6 causes the remote control ECUs 3 to recognize that the number of (five, for example) outboard motors 101 attached to the hull 100a is equal to or less than the upper limit number (four, for example).

Specifically, when transmitting the driving information from one to the other of the first communication bus 4 and the second communication bus 5, the BCU 6 performs a control to transmit the driving information to the other of the first communication bus 4 and the second communication bus 5 while integrating the driving information to reduce the number of pieces of driving information.

More specifically, when the actual number (five, for example) of outboard motors 101 is one more than the upper limit number (four, for example) of outboard motors 101, the BCU 6 performs a control to cause the remote control ECUs 3 to recognize that a number obtained by subtracting one from the actual number (five, for example) of outboard motors 101 is the upper limit number (four, for example) of outboard motors 101.

That is, when the number of outboard motors 101 actually attached to the hull 100a is five, for example, and the upper limit number of outboard motors 101 is four, for example, the BCU 6 performs a control to allocate three outboard motors 101 and two outboard motors 101 to the first communication bus 4 and the second communication bus 5, respectively, and to cause the remote control ECUs 3 to recognize that the number (five, for example) of outboard motors 101 attached to the hull 100a is equal to or less than the upper limit number (four, for example).

Specifically, the BCU 6 integrates the driving information of the outboard motor 101 at the portmost position (P) recognized by the first communication bus 4 and the driving information of the outboard motor 101 at the center port position (CP) recognized by the first communication bus 4 to transmit the integrated driving information as one piece of driving information of the outboard motor 101 at the portmost position (P) to the second communication bus 5, and transmits the driving information of the outboard motor 101 at the starboardmost position (S) without any change to the second communication bus 5 when transmitting the driving information from the first communication bus 4 to the second communication bus 5. In short, the BCU 6 transmits, to the second communication bus 5, information indicating that only two outboard motors 101 are provided on the first communication bus 4 side.

The BCU 6 integrates the driving information of the outboard motor 101 at the center port position (CP) recognized by the second communication bus 5 and the driving information of the outboard motor 101 at the center starboard position (CS) recognized by the second communication bus 5 to transmit the integrated driving information as one piece of driving information of the outboard motor 101 at the center starboard position (CS) to the second communication bus 5 when transmitting the driving information from the second communication bus 5 to the first communication bus 4. In short, the BCU 6 transmits, to the first communication bus 4, information indicating that only one outboard motor 101 is provided on the second communication bus 5 side.

The BCU 6 controls the remote control ECU 3 at the center position such that one outboard motor 101c recognized as being connected as the outboard motor 101 at the center port position (CP) by the remote control ECU 3 among the three outboard motors 101 (101a, 101c, and 101e) on the first communication bus 4 side is driven (behaves) as the outboard motor 101 at the central position (C) in a predetermined marine vessel maneuvering mode (the joystick mode, for example).

As a specific example, when the joystick 21 is operated to move the hull 100a while maintaining the orientation of the hull 100a in the starboard direction in the joystick mode, the BCU 6 performs the coordinated control such that the shift states of the two outboard motors 101 (101a and 101b) on the port side are in the forward movement state, and the shift states of the two outboard motors 101 (101d and 101e) on the starboard side are in the reverse movement state.

At this time, the BCU 6 performs the coordinated control such that the four outboard motors 101 (101a, 101b, 101d, and 101e) are positioned in a V shape while the magnitudes of the propulsive forces of the two outboard motors 101 (101a and 101b) on the port side and the magnitudes of the propulsive forces of the two outboard motors 101 (101d and 101e) on the starboard side are balanced.

At this time, the BCU 6 performs the coordinated control such that the shift state of the outboard motor 101 at the center position (C) becomes the neutral state such that one outboard motor 101c recognized as being connected as the outboard motor 101 at the port center position (CP) by the remote control ECU 3 at the central position is driven as the outboard motor 101 at the center position (C).

When the hull 100a moves while maintaining its orientation in the starboard direction, the BCU 6 may perform the coordinated control such that the magnitudes of the propulsion forces of the two outboard motors 101 (101a and 101b) on the port side and the magnitudes of the three outboard motors 101 (101c, 101d, and 101e) on the starboard side are balanced instead of stopping the outboard motor 101 at the center position (C) (putting it into the neutral state).

In short, when the outboard motor 101c actually located at the center position (C) remains recognized as the outboard motor 101 at the center port position (CP) by the remote control ECU 3, the balance of the propulsive forces, for example, of the plurality of outboard motors 101 is lost in the predetermined marine vessel maneuvering mode. Therefore, the BCU 6 controls the remote control ECU 3 connected to the outboard motor 101c at the center position to drive the outboard motor 101c as the outboard motor 101 at the center position (C).

In a speed control mode to finely adjust the speed of the hull 100a based on an operation on the operation panel 22, one predetermined outboard motor 101a, which functions as a reference for the first communication bus 4 side, transmits the driving information regarding the rotation speed of its own engine 10 to the remaining outboard motors 101b to 101e in order to equalize the rotation speeds of the engines 10 of all the outboard motors 101a to 101e. Then, the BCU 6 transmits the driving information from one predetermined outboard motor 101a to each of a plurality of outboard motors 101 (101b and 101d) on the second communication bus 5 side when transmitting the driving information in order to equalize the rotation speeds of the engines 10 of all the outboard motors 101a to 101e.

According to the various preferred embodiments of the present invention described above, the following advantageous effects are achieved.

According to a preferred embodiment of the present invention, the marine vessel maneuvering system 102 includes the first communication bus 4 to transmit an operation signal to some of the remote control ECUs 3, the second communication bus 5 to transmit an operation signal to the remaining remote control ECUs 3 excluding the some of the remote control ECUs 3, and the BCU 6 to connect the first communication bus 4 to the second communication bus 5 such that the first communication bus 4 and the second communication bus 5 communicate with each other. Accordingly, the BCU 6 connects the first communication bus 4 to the second communication bus 5 such that the first communication bus 4 and the second communication bus 5, which are different from each other, communicate with each other. Therefore, the BCU 6 between the first communication bus 4 and the second communication bus 5 mediates information transmission such that the number of outboard motors 101 recognized by the remote control ECUs 3 on the first communication bus 4 side and the number of outboard motors 101 recognized by the remote control ECUs 3 on the second communication bus 5 side become less than the number of outboard motors 101 actually attached to the hull 100a. Thus, using the remote control ECUs 3 that virtually recognize a smaller number of outboard motors 101 than the number of outboard motors 101 actually attached to the hull 100a, a larger number of outboard motors 101 than the number of outboard motors 101 recognized by existing remote controls ECU are controlled.

According to a preferred embodiment of the present invention, the plurality of remote control ECUs 3 transmit and receive the driving information regarding driving of the plurality of outboard motors 101 to and from each other via the first communication bus 4, the second communication bus 5, and the BCU 6, and perform the coordinated control to coordinate the driving of the plurality of outboard motors 101 based on the driving information. Accordingly, the driving information regarding the driving of the plurality of outboard motors 101 is transmitted and received between the plurality of remote control ECUs 3 via the first communication bus 4, the second communication bus 5, and the BCU 6 such that the coordinated control is performed to appropriately coordinate the driving of the plurality of outboard motors 101.

According to a preferred embodiment of the present invention, the upper limit number is set in the remote control ECUs 3 for the outboard motors 101 on which the remote control ECUs 3 perform the coordinated control, and the BCU 6 performs a control to divide the plurality of outboard motors 101 into two groups of a plurality of outboard motors that are each less than the upper limit number for the first communication bus 4 and the second communication bus 5, and to cause the remote control ECUs 3 to recognize that the number of outboard motors 101 attached to the hull 100a is equal to or less than the upper limit number even when the actual number of outboard motors 101 attached to the hull 100a exceeds the upper limit number. Accordingly, the remote control ECUs 3 recognize that the number of outboard motors 101 attached to the hull 100a is equal to or less than the upper limit number, and thus a larger number of outboard motors 101 than the number of outboard motors 101 recognized by existing remote control ECUs are more easily controlled.

According to a preferred embodiment of the present invention, the BCU 6 causes the remote control ECUs 3 to recognize that the number of outboard motors 101 attached to the hull 100a is equal to or less than the upper limit number by reducing the number of pieces of driving information and transmitting the driving information to the remote control ECUs 3 of the second communication bus 5 when receiving the plurality of pieces of driving information from the plurality of remote control ECUs 3 of the first communication bus 4, and reducing the number of pieces of driving information and transmitting the driving information to the remote control ECUs 3 of the first communication bus 4 when receiving the plurality of pieces of driving information from the plurality of remote control ECUs 3 of the second communication bus 5. Accordingly, the number of pieces of driving information on the second communication bus 5 side is reduced by the BCU 6 according to the number of outboard motors 101 recognized by the plurality of remote control ECUs 3 on the first communication bus 4 side. Furthermore, the number of pieces of driving information on the first communication bus 4 side is reduced by the BCU 6 according to the number of outboard motors 101 recognized by the plurality of remote control ECUs 3 on the second communication bus 5 side.

According to a preferred embodiment of the present invention, when transmitting the driving information from one to the other of the first communication bus 4 and the second communication bus 5, the BCU 6 performs a control to transmit the driving information to the other of the first communication bus 4 and the second communication bus 5 while integrating the driving information to reduce the number of pieces of driving information. Accordingly, the number of pieces of driving information transmitted from one to the other of the first communication bus 4 and the second communication bus 5 is easily reduced by integrating the driving information in the BCU 6.

According to a preferred embodiment of the present invention, the BCU 6 transmits information indicating that the engine 10 of one outboard motor 101 is stopped as integrated driving information when the engine 10 of one of the plurality of outboard motors 101 with the integrated driving information is stopped when transmitting the driving information in order to confirm driving of the engines 10 of all the outboard motors 101. Accordingly, the remote control ECUs 3 are prevented from erroneously recognizing that the engines 10 of all the outboard motors 101 are driven although the engine 10 of one of the plurality of outboard motors 101 with the integrated driving information is stopped.

According to a preferred embodiment of the present invention, the BCU 6 performs a control to cause the remote control ECUs 3 to recognize that the number obtained by subtracting one from the actual number of outboard motors 101 is the upper limit number of outboard motors 101 when the actual number of outboard motors 101 is one more than the upper limit number of outboard motors 101. Accordingly, the marine vessel maneuvering system 102 is able to control driving of the number of outboard motors 101 obtained by adding one to the upper limit number of outboard motors 101 recognized by existing remote control ECUs.

According to a preferred embodiment of the present invention, the BCU 6 performs a control to allocate three outboard motors 101 and two outboard motors 101 to the first communication bus 4 and the second communication bus 5, respectively, and to cause the remote control ECUs 3 to recognize that the number of outboard motors 101 attached to the hull 100*a* is equal to or less than the upper limit number when the number of outboard motors 101 attached to the hull 100*a* is five, and the upper limit number of outboard motors 101 is four. Accordingly, the marine vessel maneuvering system 102 is able to control driving of five outboard motors 101 even when the upper limit number of outboard motors 101 is four due to the structure in which the remote control ECUs 3 recognize four outboard motors 101, the three remote control ECUs 3 are connected to the first communication bus 4, and the two remote control ECUs 3 are connected to the second communication bus 5.

According to a preferred embodiment of the present invention, the outboard motors 101 actually attached to the hull 100*a* include five outboard motors 101 at the portmost position, the center port position, the center position, the center starboard position, and the starboardmost position of the hull 101*a*, the plurality of remote control ECUs 3 on the first communication bus 4 side recognize that three of the outboard motor 101 at the starboardmost position, the outboard motor 101 at the portmost position, and one of the outboard motor 101 at the center port position and the outboard motor 101 at the center starboard position are connected thereto, and the plurality of remote control ECUs 3 on the second communication bus 5 side recognize that the outboard motor 101 at the center port position and the outboard motor 101 at the center starboard position are connected thereto. Accordingly, while the remote control ECUs 3 recognize that the upper limit number of outboard motors is four, three outboard motors 101, the driving of which is controlled as the outboard motor 101 at the starboardmost position, the outboard motor 101 at the portmost position, and one of the outboard motor 101 at the center port position and the outboard motor 101 at the center starboard position, are connected to the remote control ECUs 3 on the first communication bus 4 side. Furthermore, while the remote control ECUs 3 recognize that the upper limit number of outboard motors is four, two outboard motors 101, the driving of which is controlled as the outboard motor 101 at the center port position and the outboard motor 101 at the center starboard position, are connected to the remote control ECUs 3 on the second communication bus 5 side.

According to a preferred embodiment of the present invention, the BCU 6 controls a corresponding remote control ECU 3 to drive, as the outboard motor 101 at the center position, one outboard motor 101 recognized as being connected as one of the outboard motor 101 at the center port position and the outboard motor 101 at the center starboard position by the corresponding remote control ECU 3 among the three outboard motors 101 on the first communication bus 4 side in the predetermined marine vessel maneuvering mode. Accordingly, when the plurality of remote control ECUs 3 recognize that the upper limit number of outboard motors 101 is four, one outboard motor 101 is driven not as the outboard motors 101 at the portmost position, the center port position, the center starboard position, and the starboardmost position, but as the outboard motor 101 at the center position. Consequently, in the predetermined marine vessel maneuvering mode, the balance of the driving forces and the directions of the outboard motors 101 is prevented from being lost.

According to a preferred embodiment of the present invention, one predetermined outboard motor 101, which functions as a reference for the first communication bus 4 side, transmits the driving information regarding the rotation speed of its own engine 10 to the remaining outboard motors 101 in order to equalize the rotation speeds of the engines 10 of all the outboard motors 101, and the BCU 6 transmits the driving information from one predetermined outboard motor 101 to each of the outboard motors 101 on the second communication bus 5 side when transmitting the driving information in order to equalize the rotation speeds of the engines 10 of all the outboard motors 101. Accordingly, the BCU 6 transmits the driving information regarding the rotation speed of the engine 10 from one predetermined outboard motor 101 on the first communication bus 4 side to a plurality of locations, and thus all the remote control ECUs 3 on the second communication bus 5 side receive one piece of driving information regarding the rotation speed of the engine 10 transmitted to the outboard motors 101 on the second communication bus 5 side.

According to a preferred embodiment of the present invention, the BCU 6 performs a control to automatically drive the plurality of outboard motors 101 to move the hull 100*a* in the automatic marine vessel maneuvering mode in addition to connecting the first communication bus 4 to the second communication bus 5 such that the first communication bus 4 and the second communication bus 5 communicate with each other. Accordingly, the BCU 6 is used for two applications to connect the first communication bus 4 to the second communication bus 5 such that the first communication bus 4 and the second communication bus 5 communicate with each other and to perform a control to automatically drive the plurality of outboard motors 101 to move the hull 100*a* in the automatic marine vessel maneuvering mode. Consequently, the number of components is reduced, and the system structure is simplified as compared with a case in which the two applications are achieved by separate structures.

According to a preferred embodiment of the present invention, the BCU 6 performs a control to automatically drive the plurality of outboard motors 101 to hold the position and orientation of the hull 100*a* in the fixed point holding mode in addition to connecting the first communication bus 4 to the second communication bus 5 such that the first communication bus 4 and the second communication bus 5 communicate with each other. Accordingly, the BCU 6 is used for two applications to connect the first communication bus 4 to the second communication bus 5 such that the first communication bus 4 and the second communication bus 5 communicate with each other and to perform a control to automatically drive the plurality of outboard motors 101 to hold the position and orientation of the hull 100a in the fixed point holding mode. Consequently, the number of components is reduced, and the system structure is simplified as compared with a case in which the two applications are achieved by separate structures.

According to a preferred embodiment of the present invention, the first communication bus 4 is directly connected to the remote control lever 20, the joystick 21, and the operation panel 22, and the second communication bus 5 is indirectly connected to the remote control lever 20, the joystick 21, and the operation panel 22 via the BCU 6 and the first communication bus 4. Accordingly, the plurality of remote control ECUs 3, the remote control lever 20, the joystick 21, and the operation panel 22 are connected to the BCU 6 via the common first communication bus 4. Therefore, the system structure is simplified.

According to a preferred embodiment of the present invention, the first communication bus 4 and the second communication bus 5 are communicably connected to each other by the bus cables 4a and 5a based on the CAN communication standard. Accordingly, mutual communication between the plurality of remote control ECUs 3 is easily achieved by the bus cables 4a and 5a based on the CAN communication standard.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the five outboard motors are preferably attached to the hull in preferred embodiments described above, for example, the present invention is not restricted to this. In the present invention, a plurality of outboard motors other than five outboard motors may alternatively be attached to the hull.

While the outboard motors driven by the engines are preferably attached as propulsion devices to the hull in preferred embodiments described above, the present invention is not restricted to this. In the present invention, electric propulsion devices may alternatively be attached to the hull as propulsion devices.

While the remote control lever, the joystick, and the operation panel (operator), the BCU (gateway device), and the remote control ECUs (propulsion device controllers) are preferably connected by the first communication bus in preferred embodiments described above, the present invention is not restricted to this. In the present invention, the gateway device and the propulsion device controller may alternatively be connected by the first communication bus, and the gateway device and the operator may alternatively be connected by a cable separate from the first communication bus.

While the number of outboard motors recognized by the remote control ECUs (propulsion device controllers) is preferably four, for example, and the number of outboard motors actually attached to the hull is preferably five, for example, in preferred embodiments described above, the present invention is not restricted to this. In the present invention, the number of outboard motors recognized by the propulsion device controllers may alternatively be four, and the number of outboard motors actually attached to the hull may alternatively be six, for example. In such a case, three propulsion device controllers are connected to the first communication bus (three outboard motors are provided on the first communication bus side), and three propulsion device controllers are connected to the second communication bus (three outboard motors are provided on the second communication bus side), for example.

While the operator preferably includes the remote control lever, the joystick, and the operation panel in preferred embodiments described above, the present invention is not restricted to this. In the present invention, the operator may alternatively include any one or two of the remote control lever, the joystick, and the operation panel. Furthermore, the operator may alternatively include an operator different from the remote control lever, the joystick, and the operation panel.

While the gateway device preferably includes a BCU function (a function of maneuvering the marine vessel in the automatic marine vessel maneuvering mode and the fixed point holding mode) in preferred embodiments described above, the present invention is not restricted to this. In the present invention, the gateway device may alternatively be a device that does not include the BCU function (the function of maneuvering the marine vessel in the automatic marine vessel maneuvering mode and the fixed point holding mode).

While the automatic marine vessel maneuvering mode to automatically drive the plurality of outboard motors to move the hull preferably includes the target orientation holding mode and the target course holding mode in preferred embodiments described above, the present invention is not restricted to this. In the present invention, the automatic marine vessel maneuvering mode may alternatively include various modes such as a track point mode to move the marine vessel such that the marine vessel passes through a predetermined point and a movement mode to move the marine vessel in a zigzag (or spiral) manner.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel maneuvering system comprising:
   an operator to receive an operation to drive a plurality of propulsion devices attached to a hull;
   a plurality of propulsion device controllers in the hull and outside the plurality of propulsion devices, one for each of the plurality of propulsion devices, configured or programmed to control driving of the plurality of propulsion devices based on an operation signal from the operator;
   a first communication bus to transmit the operation signal to some, but not all, of the plurality of propulsion device controllers, the first communication bus being connected to the some of the plurality of propulsion devices;
   a second communication bus to transmit the operation signal to remaining propulsion device controllers excluding the some of the plurality of propulsion device controllers, the second communication bus being connected to the remaining plurality of propulsion devices; and a gateway device to connect the first communication bus to the second communication bus such that the first communication bus and the second communication bus communicate with each other; wherein an upper limit number is set in the plurality of propulsion device controllers for the plurality of propulsion devices on which the plurality of propulsion device controllers perform a coordinated control to coordinate the driving of the plurality of propulsion devices based on driving information regarding driving of the plurality of propulsion devices; and the gateway device is configured or programmed to reduce a number of pieces of the driving information transmitted from one of the first communication bus and the second communication bus to the other.

2. The marine vessel maneuvering system according to claim 1, wherein the plurality of propulsion device controllers are configured or programmed to:

transmit and receive the driving information regarding driving of the plurality of propulsion devices to and from each other via the first communication bus, the second communication bus, and the gateway device.

3. The marine vessel maneuvering system according to claim 2, wherein the gateway device is configured or programmed to perform a control to divide the plurality of propulsion devices into two groups of a plurality of propulsion devices that are each less than the upper limit number for the first communication bus and the second communication bus, and to cause the plurality of propulsion device controllers to recognize that a number of the propulsion devices attached to the hull is equal to or less than the upper limit number even when an actual number of the propulsion devices attached to the hull exceeds the upper limit number.

4. The marine vessel maneuvering system according to claim 3, wherein the gateway device is configured or programmed to cause the plurality of propulsion device controllers to recognize that the number of the propulsion devices attached to the hull is equal to or less than the upper limit number by reducing the number of pieces of the driving information and transmitting the driving information to the propulsion device controllers of the second communication bus when receiving a plurality of pieces of the driving information from the propulsion device controllers of the first communication bus, and reducing the number of pieces of the driving information and transmitting the driving information to the propulsion device controllers of the first communication bus when receiving the plurality of pieces of the driving information from the propulsion device controllers of the second communication bus.

5. The marine vessel maneuvering system according to claim 4, wherein, when transmitting the driving information from one to the other of the first communication bus and the second communication bus, the gateway device is configured or programmed to perform a control to transmit the driving information to the other of the first communication bus and the second communication bus while integrating the driving information to reduce the number of pieces of the driving information.

6. The marine vessel maneuvering system according to claim 5, wherein, when transmitting the driving information in order to confirm driving of engines of all of the plurality of propulsion devices, the gateway device is configured or programmed to transmit information indicating that an engine of one propulsion device is stopped as the integrated driving information when the engine of one of the plurality of propulsion devices with the integrated driving information is stopped.

7. The marine vessel maneuvering system according to claim 3, wherein the gateway device is configured or programmed to perform a control to cause the plurality of propulsion device controllers to recognize that a number obtained by subtracting one from the actual number of the propulsion devices is the upper limit number of the propulsion devices when the actual number of the propulsion devices is one more than the upper limit number of the propulsion devices.

8. The marine vessel maneuvering system according to claim 7, wherein the gateway device is configured or programmed to perform a control to allocate three propulsion devices and two propulsion devices to the first communication bus and the second communication bus, respectively, and to cause the plurality of propulsion device controllers to recognize that the number of the propulsion devices attached to the hull is equal to or less than the upper limit number when the number of the propulsion devices attached to the hull is five, and the upper limit number of the propulsion devices is four.

9. The marine vessel maneuvering system according to claim 8, wherein the plurality of propulsion devices actually attached to the hull include five propulsion devices at a portmost position, a center port position, a center position, a center starboard position, and a starboardmost position of the hull;

the propulsion device controllers of the first communication bus are configured or programmed to recognize that three of the propulsion device at the starboardmost position, the propulsion device at the portmost position, and one of the propulsion device at the center port position and the propulsion device at the center starboard position are connected thereto; and the propulsion device controllers of the second communication bus are configured or programmed to recognize that the propulsion device at the center port position and the propulsion device at the center starboard position are connected thereto.

10. The marine vessel maneuvering system according to claim 9, wherein the gateway device is configured or programmed to control a corresponding propulsion device controller to drive, as the propulsion device at the center position, one propulsion device recognized as being connected as one of the propulsion device at the center port position and the propulsion device at the center starboard position by the corresponding propulsion device controller among the three propulsion devices of the first communication bus in a predetermined marine vessel maneuvering mode.

11. The marine vessel maneuvering system according to claim 2, wherein one predetermined propulsion device of the plurality of propulsion devices, which functions as a reference for the first communication bus, transmits the driving information regarding a rotation speed of its own engine to remaining propulsion devices of the plurality of propulsion devices in order to equalize rotation speeds of engines of all of the plurality of propulsion devices; and the gateway device is configured or programmed to transmit the driving information from the one predetermined propulsion device to each of the propulsion devices of the second communication bus when transmitting the driving information in order to equalize the rotation speeds of the engines of all of the plurality of propulsion devices.

12. The marine vessel maneuvering system according to claim 1, wherein the gateway device is configured or programmed to perform a control to automatically drive the plurality of propulsion devices to move the hull in an automatic marine vessel maneuvering mode.

13. The marine vessel maneuvering system according to claim 1, wherein the gateway device is configured or programmed to perform a control to automatically drive the plurality of propulsion devices to hold a position and an orientation of the hull in a fixed point holding mode.

14. The marine vessel maneuvering system according to claim 1, wherein
the first communication bus is directly connected to the operator; and
the second communication bus is indirectly connected to the operator via the gateway device and the first communication bus.

15. The marine vessel maneuvering system according to claim 1, wherein the first communication bus and the second communication bus are communicably connected to each other by a bus cable based on a CAN communication standard.

16. A marine vessel comprising:
a hull; and
a marine vessel maneuvering system provided on the hull; wherein
the marine vessel maneuvering system includes:
an operator to receive an operation to drive a plurality of propulsion devices attached to the hull;
a plurality of propulsion device controllers in the hull and outside the plurality of propulsion devices, one for each of the plurality of propulsion devices, configured or programmed to control driving of the plurality of propulsion devices based on an operation signal from the operator;
a first communication bus to transmit the operation signal to some, but not all, of the plurality of propulsion device controllers, the first communication bus being connected to the some of the plurality of propulsion devices;
a second communication bus to transmit the operation signal to remaining propulsion device controllers excluding the some of the plurality of propulsion device controllers, the second communication bus being connected to the remaining plurality of propulsion devices; and
a gateway device to connect the first communication bus to the second communication bus such that the first communication bus and the second communication bus communicate with each other; wherein an upper limit number is set in the plurality of propulsion device controllers for the plurality of propulsion devices on which the plurality of propulsion device controllers perform a coordinated control to coordinate the driving of the plurality of propulsion devices based on driving information regarding driving of the plurality of propulsion devices; and
the gateway device is configured or programmed to reduce a number of pieces of the driving information transmitted from one of the first communication bus and the second communication bus to the other.

17. The marine vessel according to claim 16, wherein the plurality of propulsion device controllers are configured or programmed to:
transmit and receive the driving information regarding driving of the plurality of propulsion devices to and from each other via the first communication bus, the second communication bus, and the gateway device.

18. The marine vessel according to claim 17, wherein
the gateway device is configured or programmed to perform a control to divide the plurality of propulsion devices into two groups of a plurality of propulsion devices that are each less than the upper limit number for the first communication bus and the second communication bus, and to cause the plurality of propulsion device controllers to recognize that a number of the propulsion devices attached to the hull is equal to or less than the upper limit number even when an actual number of the propulsion devices attached to the hull exceeds the upper limit number.

19. The marine vessel according to claim 18, wherein the gateway device is configured or programmed to cause the plurality of propulsion device controllers to recognize that a number of the propulsion devices attached to the hull is equal to or less than the upper limit number by reducing the number of pieces of the driving information and transmitting the driving information to the propulsion device controllers of the second communication bus when receiving a plurality of pieces of the driving information from the propulsion device controllers of the first communication bus, and reducing the number of pieces of the driving information and transmitting the driving information to the propulsion device controllers of the first communication bus when receiving the plurality of pieces of the driving information from the propulsion device controllers of the second communication bus.

20. The marine vessel according to claim 19, wherein, when transmitting the driving information from one to the other of the first communication bus and the second communication bus, the gateway device is configured or programmed to perform a control to transmit the driving information to the other of the first communication bus and the second communication bus while integrating the driving information to reduce the number of pieces of the driving information.

* * * * *